United States Patent
Vonikakis

(10) Patent No.: US 10,359,855 B1
(45) Date of Patent: Jul. 23, 2019

(54) HAPTIC SYSTEM FOR PROVIDING SENSORY AUGMENTATION TO A SUBJECT AND METHOD THEREOF

(71) Applicant: PANASONIC INTELLECTUAL PROPERTY MANAGEMENT CO., LTD., Osaka (JP)

(72) Inventor: Vasileios Vonikakis, Singapore (SG)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/922,476

(22) Filed: Mar. 15, 2018

(51) Int. Cl.
- G06F 3/01 (2006.01)
- B60N 2/90 (2018.01)
- G08B 6/00 (2006.01)

(52) U.S. Cl.
CPC .............. G06F 3/016 (2013.01); G06F 3/011 (2013.01); *B60N 2002/981* (2018.02); *G06F 2203/014* (2013.01); *G08B 6/00* (2013.01)

(58) Field of Classification Search
CPC .......... G06F 3/016; G06F 3/011; G06F 17/10; G06G 7/78; G08G 1/16; B60Q 9/00; B60Q 1/00
USPC ..... 340/407.1, 435, 436, 438, 903; 345/157, 345/173; 701/1, 301
See application file for complete search history.

(56) References Cited

U.S. PATENT DOCUMENTS

| | | | |
|---|---|---|---|
| 7,228,212 B2 | 6/2007 | Hijikata et al. | |
| 7,245,231 B2 | 7/2007 | Kiefer et al. | |
| 7,681,949 B2 | 3/2010 | Nathan et al. | |
| 2004/0049323 A1 | 3/2004 | Tijerina et al. | |
| 2011/0148607 A1* | 6/2011 | Zeleny | A41D 13/0015 340/407.1 |
| 2014/0008948 A1 | 1/2014 | Rockwell et al. | |
| 2018/0022277 A1 | 1/2018 | Tayama | |

FOREIGN PATENT DOCUMENTS

JP 2016-151771 A 8/2016

\* cited by examiner

*Primary Examiner* — Hung T Nguyen
(74) *Attorney, Agent, or Firm* — McDermott Will & Emery LLP

(57) ABSTRACT

There is provided a haptic system for providing sensory augmentation to a subject, the haptic system including a haptic surface for interacting with the subject, the haptic surface including an array of haptic portions, each haptic portion configured to be controllable to perform a haptic action; an image generator configured to generate a depth map based on information obtained on a scene captured of a surrounding environment; and a controller configured to control each of the array of haptic portions based on a property of a corresponding portion of the depth map. There is also provided a corresponding method for providing sensory augmentation to a subject and a vehicle having installed therein the haptic system.

34 Claims, 12 Drawing Sheets

HAPTIC SYSTEM FOR PROVIDING SENSORY AUGMENTATION TO A SUBJECT AND METHOD THEREOF

TECHNICAL FIELD

The present invention generally relates to a haptic system for providing sensory augmentation to a subject and a method thereof, such as, but not limited to, a driver in a vehicle.

BACKGROUND

Human sensory perception is limited by the nature of human senses. For example, humans are not able to see in the dark or at least not able to see sufficiently well under low-visibility conditions, such as night, fog, rain, and so on.

As an example, in the automotive industry, there exist various types of driver assistance systems for alerting or warning a driver of potential dangers through vision, sound and/or touch based on the detection of certain events, such as out of lane, speeding, drowsiness, close proximity to an object, and so on. However, such conventional warning systems typically only alert the driver of the existence of certain events, such as a voice alert to the driver when the speed of the vehicle exceeds a speed limit, a touch alert through the vibration of the steering wheel when the vehicle departs a lane, a touch alert through the vibration of the driver's seat when a nearby object is detected, and so on. That is, in such conventional warning systems, the warning or alert is based on a binary condition (i.e., on or off). For example, under normal circumstances (e.g., when no danger is detected), the warning system is inactive or does not provide any alert, and only under abnormal circumstances (e.g., when danger is detected), the warning system is activated to alert the driver. Thus, such conventional warning systems only provide a type of notification, which activate (or be in an "ON" state) to notify the driver when certain event(s) is detected and otherwise remain inactive (or be in an "OFF" state).

However, such conventional warning systems suffer from various problems or issues. For example, although the driver is notified of the existence of certain event(s), there is a lack of additional information or details associated with such event(s) being provided or conveyed to the driver. For example, although conventional warning systems may notify the driver of a nearby object, the driver may only be aware that there is a nearby object, but may not be aware of various additional information about such an event that may be helpful to the driver, such as the location/direction of the nearby object and the degree of proximity to the nearby object. In such a case, for example, the driver may have to resort to turning his/her head around to look behind the vehicle in an attempt to locate the object, which may undesirably distract the driver's concentration on driving and increase the chance of a traffic accident. Furthermore, as mentioned above, since the warning or alert is based on a binary condition, the driver does not receive continuous feedback on the surrounding environment and is only alerted when immediate or urgent action is necessary. The driver may thus not be able to anticipate such an alert, and thus may be surprised when alerted.

A need therefore exists to provide a haptic system for providing sensory augmentation to a subject that seeks to overcome, or at least ameliorate, one or more of the deficiencies of conventional haptic systems, such as to convey more information about certain event(s) to the subject and/or to enable the subject to be more aware of the surrounding environment. It is against this background that the present invention has been developed.

SUMMARY

According to a first aspect of the present invention, there is provided a haptic system for providing sensory augmentation to a subject, the haptic system comprising:
a haptic surface for interacting with the subject, the haptic surface comprising an array of haptic portions, each haptic portion configured to be controllable to perform a haptic action;
an image generator configured to generate a depth map based on information obtained on a scene captured of a surrounding environment; and
a controller configured to control each of the array of haptic portions based on a property of a corresponding portion of the depth map.

According to a second aspect of the present invention, there is provided a vehicle comprising:
a seat;
a sensor configured to obtain information on a scene of a surrounding environment; and
a haptic system for providing sensory augmentation to a subject, the haptic system comprising:
a haptic surface for interacting with the subject, the haptic surface comprising an array of haptic portions, each haptic portion configured to be controllable to perform a haptic action;
an image generator configured to generate a depth map based on the information obtained on the scene captured of the surrounding environment; and
a controller configured to control each of the array of haptic portions based on a property of a corresponding portion of the depth map,
wherein the haptic surface is arranged on the seat of the vehicle to provide sensory augmentation to the subject when seated on the seat.

According to a third aspect of the present invention, there is provided a method for providing sensory augmentation to a subject, the method comprising:
providing a haptic surface for interacting with the subject, the haptic surface comprising an array of haptic portions, each haptic portion configured to be controllable to perform a haptic action;
generating a depth map based on information obtained on a scene captured of a surrounding environment; and
controlling each of the array of haptic portions based on a property of a corresponding portion of the depth map.

BRIEF DESCRIPTION OF THE DRAWINGS

Embodiments of the present invention will be better understood and readily apparent to one of ordinary skill in the art from the following written description, by way of example only, and in conjunction with the drawings, in which.

DETAILED DESCRIPTION

As mentioned in the background, human sensory perception is limited by the nature of human senses. For example, humans are not able to see in the dark or at least not able to see sufficiently well under low-visibility conditions, such as night, fog, rain, and so on. Humans are also not able to see outside of their field of visual, such as, out of their line of sight. Accordingly, various embodiments of the present invention provide a haptic system for providing sensory augmentation to a subject, and a method thereof. In the context of various embodiments, a subject may refer to a person, such as a driver when the haptic system is implemented or installed in a vehicle. In general, sensory augmentation may be considered as extending the ability of a subject to sense aspect(s) of the environment that are not normally perceivable by the subject in its natural state, or in short, extending the subject senses (e.g., human senses).

In general, the term "haptic" means relating to the sense of touch. For example, it is known in the art that haptic feedback (or haptic effect) may generally be divided into two different classes, namely, tacticle feedback (which may also be referred to as tactile feedback) or kinesthetic feedback. Thus, in various embodiments, haptic feedback may refer to a tactile feedback or a kinesthetic feedback, or a combination of tactile and kinesthetic feedbacks. Therefore, the haptic system according to various embodiments may be configured to extend the senses of a subject through the sense of touch, or in other words, by providing a haptic effect or feedback to the subject. It will be appreciated that the haptic system is not limited to only providing a haptic feedback to the subject, and may also provide one or more additional types of feedbacks, such as visual and/or sound (e.g., a combination of two or more types of feedbacks). That is, the haptic system is at least able to provide a haptic effect or feedback.

Figure 1:
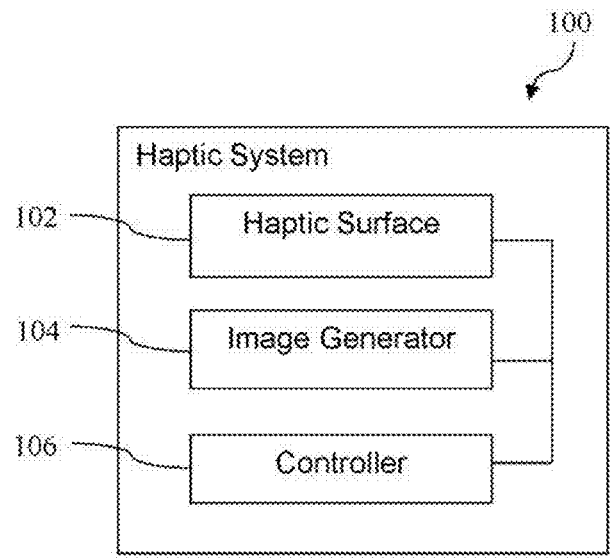
FIG. 1 depicts a schematic block diagram of a haptic system for providing sensory augmentation to a subject according to various embodiments of the present invention.

FIG. 1 depicts a schematic block diagram of a haptic system 100 for providing sensory augmentation to a subject according to various embodiments of the present invention. The haptic system 100 comprises a haptic surface 102 for interacting with the subject, the haptic surface comprising an array of haptic portions, each haptic portion configured to be controllable to perform a haptic action; an image generator 104 configured to generate a depth map based on information obtained on a scene captured of a surrounding environment; and a controller 106 configured to control each of the array of haptic portions (i.e., each haptic portion in the array of haptic portions) based on a property of a corresponding portion of the depth map.

In various embodiments, the haptic surface may have various forms or configurations as desired or as appropriate as long as the haptic surface comprises an array of haptic portions, each portion being controllable to perform a haptic action. That is, the haptic surface is not limited to any specific form or configuration as long as the haptic surface comprises the above-mentioned array of haptic portions.

For example, in various embodiments, the array of haptic portions may be formed or realized by an array of haptic elements, each haptic element being controllable to perform a haptic action. That is, an array of haptic elements may be configured (e.g., arranged) to form a haptic surface for interacting with the subject. In such embodiments, a haptic element may be any device configured to or capable of producing a haptic effect or feedback on a subject when actuated, such as, based on a control signal from a controller. The haptic surface may then be constituted or formed by the respective surfaces of the array of haptic elements for interacting with the subject. In various embodiments, the haptic element may be a vibrating element (vibrator), which may also be referred to as an actuating element (actuator). In various embodiments, in the case of an array of haptic elements, the array of haptic elements may be arranged on a substrate to form a desired shape or configuration, and each haptic element being electrically connected (e.g., via wire(s) or electrical cable(s)) and/or communicatively coupled (e.g., wired or wirelessly) to one or more controllers for receiving one or more control signals therefrom to produce the corresponding haptic action based on the one or more control signals. The electrical connection may also provide electrical power to the respective haptic element. It will be appreciated that the substrate may be made of any type of material (or a combination of different types of materials) as appropriate for the desired purpose, such as a hard material (e.g., hard polymeric material) or a soft or flexible material (e.g., soft polymeric material). Accordingly, a haptic device comprising the above-mentioned substrate and the above-mentioned array of haptic elements arranged thereon may be provided.

As a further example, in various embodiments, there may be provided a haptic device comprising a material configured to have a desired or an appropriate shape or configuration, the material having a surface comprising a plurality of portions being controllable to perform a haptic action for interacting with the subject. That is, a body of material may be provided, the body having a surface comprising a plurality of portions being controllable to perform a haptic action for interacting with the subject. In such embodiments, the haptic surface may thus be constituted or formed by the surface of the body for interacting with the subject, and the plurality of haptic portions may thus correspond to the plurality of portions of the surface of the body. It will be appreciated by a person skilled in the art that various techniques may be applied to control various portions (e.g., specific or desired positions or locations) of the surface of the body of material to perform a haptic action based on a control signal from a controller, and the present invention is not limited to any particular technique as long as the plurality of portions is controllable to perform a haptic action. By way of example only and without limitation, the body of material may be configured to be deformable at desired or specific locations/regions (corresponding to the locations of the plurality of portions of the surface) thereof based on a control signal to perform a haptic action at such locations/regions. For example, the body of material may have embedded therein a grid of conducting wires configured such that the points of intersection at various locations/regions (e.g., specific positions or locations) of the body correspond to the plurality of portions of the surface of the body desired to be controllable to perform the haptic action. In this regard, each region of the body configured to perform the haptic action may be referred to as a dielectric elastomer actuator. As another example, the body of material may have embedded therein a grid of air pockets arranged at various locations/regions of the body corresponding to plurality of portions of the surface of the body desired to be controllable to perform the haptic action. In this regard, each air pocket may have an air channel connected thereto for transferring air into and/or out of the air pocket for controlling the degree of air pressure therein so as to control the size of the air pocket (e.g., expansion) in performing the haptic action. It will be appreciated by a person skilled in the art that to the material of the haptic device may be any suitable or appropriate material known in the art, such as a deformable or an elastomeric material.

It will appreciated by a person skilled in the art that the haptic device may be configured to have any desired or appropriate shape or configuration for the intended purpose. By way of an example only, in the case of the haptic device being implemented in or applied to a backrest of a driver's seat of a vehicle, the haptic device may thus be configured to have a shape or configuration in view of or corresponding to the backrest of the driver's seat. In such a case, for example, the above-mentioned body of material may thus be a layer of material having a thickness as desired or as appropriate. It will also be appreciated by a person skilled in the art that the array of haptic portions may be arranged to form any desired or appropriate shape or configuration based on various factors, such as but not limited to, its intended application and/or the desired resolution. Accordingly, the haptic device, including the array of haptic portions, is not limited to any specific form or configuration.

Accordingly, in various embodiments, the haptic feedback may be created in various ways, for example, by a mechanical motion (e.g., vibration, pulsation or applied pressure), ultrasounds, air pressure or deformable materials through electric signals (e.g., dielectric elastomer actuators), and so on. It will be appreciated by a person skilled in the art that the haptic feedback according to various embodiments of the present invention is generally not limited to any particular ways of being generated, as long as, for example, the haptic feedback can be provided by an interface (a surface) for interacting with a subject, the interface comprising portions that are individually or separately controllable to each provide a corresponding (variable) degree or intensity of the haptic feedback to the subject. Accordingly, in various embodiments, each haptic portion in the array of haptic portions is individually or separately controllable to produce the haptic effect on the subject. In other words, each haptic portion (e.g., the corresponding haptic element or the corresponding haptic region) is electrically connected and/or communicatively coupled (e.g., wired or wirelessly) to one or more controllers for receiving one or more control signals therefrom to produce the corresponding haptic effect based on the one or more control signals.

In various embodiments, a depth map may refer to an image comprising information (depth information) relating to the distance of the surfaces of objects in a scene from a viewpoint. For example, an image comprises a plurality of pixels, each pixel having a pixel value, and each pixel value may be configured/encoded to correspond to the distance of a surface of an object (if present) in the corresponding portion of the scene from a viewpoint (e.g., from a sensor). Therefore, the depth map may comprises a two-dimensional array (e.g., table or grid) of values (e.g., a value at each pixel) indicating the respective distances (which may also be referred to as depth values). The depth map may be realized or visualized in various manner or forms as desired or as appropriate, such as through grayscale or colours, texture patterns, and so on.

Accordingly, since the controller 106 of the haptic system 100 is configured to control each haptic portion in the array of haptic portions 102 based on a property of a corresponding portion of the depth map (e.g., a pixel value of a corresponding pixel), significantly more information or details on the scene of interest of the surrounding environment may be conveyed to the subject through the haptic effect produced by the array of haptic portions 102. For example, the subject is not merely notified of the existence of an event (e.g., close proximity to an object) to warn the subject of a potential danger (e.g., a potential collision), such as, a binary condition as mentioned in the background, but each haptic portion is controllable by the controller 106 based on a property of a corresponding portion of the depth map. Thus, the level of haptic effect produced by each haptic portion is variable within a range of an attribute (e.g., frequency (intensity) and/or amplitude) based on the property of the corresponding portion of the depth map. That is, a wide range of haptic effect may be produced by each haptic portion to convey more information on the scene to the subject, such as but not limited to, an indication of the degree of proximity of any object(s) detected in the scene to the subject by controlling the haptic portion to produce a haptic effect at a level (e.g., frequency/intensity level and/or amplitude level) corresponding or correlating to the degree of proximity detected, of which has been encoded in the corresponding portion of the depth map generated by the image generator 104. As an example, through each haptic portion, the subject may be able to sense an object as the object approaches closer (e.g., not only a notification when the object is at a predetermined distance threshold or closer) by adjusting the level of the haptic effect as the object approaches closer (e.g., increasing intensity level and/or amplitude level as the object approaches closer). For example, the level of haptic effect produced by each haptic portion may be based on the degree of proximity to the object, and continuously adjusted as the degree of proximity to the object changes. This advantageously increases or improves the subject's awareness of the surrounding environment, thereby improving the subject's ability to react to various events/situations more effectively and the overall safety.

Furthermore, since each haptic portion in the array of haptic portions 102 is individually or separately controllable based on a property of a corresponding portion of the depth map (e.g., a pixel value of a corresponding pixel in the depth map), the subject is able to sense more information or details of the scene through the haptic effect produced by each haptic portion at different positions on the haptic surface interacting with the subject. For example and without limitation, not only will the subject be aware of nearby object(s), the subject may also be able to sense the location/direction of the nearby object (e.g., the position of a group of haptic portions producing the haptic effect may correspond to a corresponding location of the scene which the nearby object is located, thus providing an indication of the location/direction of the nearby object), and/or the size and/or shape of the nearby object (e.g., the number of haptic portions in a group of haptic portions and/or the shape (overall shape) formed by the group of haptic portions producing the haptic effect may provide an indication of the corresponding size and/or shape of the nearby object). Furthermore, by being able to sense the location/direction of the nearby object, multiple objects at different locations in the scene may also be able to be sensed by the subject simultaneously, for example, by the corresponding separate groups of haptic portions producing the corresponding haptic effect. For example, a left group of haptic portions and a right group of haptic portions both producing haptic effects at a corresponding intensity and/or amplitude level may indicate nearby objects at both the left and right locations of the scene.

Accordingly, the haptic system 100 according to various embodiments of the present invention is advantageously able to improve the subject's awareness of the surrounding environment, thereby improving the subject's ability to react to various events/situations more effectively and the overall safety.

In various embodiments, the depth map comprises a plurality of portions, the property of each portion being determined based on a degree of proximity associated with a corresponding portion of the scene captured in the depth map.

In various embodiments, the degree of proximity associated with a corresponding portion of the scene relates to a distance of a surface of one or more scene objects captured in the corresponding portion (or region) of the scene from a viewpoint. Therefore, the depth map may be an image that includes information relating to the distance of the surfaces of scene objects from the viewpoint. As an example, in the case of a vehicle, the degree of proximity relates to the distance of a surface of one or more scene objects captured in the corresponding portion (or region) of the scene from a sensor (viewpoint) affixed to the vehicle.

In various embodiments, each portion of the depth map corresponds to a pixel or a group of adjacent or neighboring pixels, and the property of each portion has a value corresponding to a pixel value. For example, the depth map may be a two-dimensional (2D) array (e.g., table or grid) of values (e.g., a value at each pixel) indicating the respective distances from a viewpoint. For example, the 2D array may have a predetermined resolution of M×N pixels and each pixel is encoded with a pixel value for the degree of proximity (e.g., the pixel value predetermined for the particular degree of proximity) associated with the corresponding portion of the scene detected. In various embodiments, the depth map may be realized or visualized as a colour image and each pixel value may thus denote or represent a particular colour, or the depth may be a grayscale image and each pixel value may thus denote or represent a particular shade of grey or intensity (brightness).

In various embodiments, the image generator 104 is configured to generate the depth map continuously for a plurality of consecutive time instances based on the respective information obtained on the scene continuously for the plurality of consecutive time instances, and the controller 106 is configured to control each of the array of haptic portions continuously such that for each time instance, each of the array of haptic portions is controlled based on the property of the corresponding portion of the depth map generated for the time instance. It will be appreciated by a person skilled in the art that the consecutive time instances may be set as desired or as appropriate based on various factors, such as the desired rate (e.g., update rate) of the haptic feedback and/or the processing power of the haptic system (e.g., the image generator 104 and/or the controller 106). By way of example only and without limitations, consecutive time instances may have a period ranging from 0.001 second to 5 seconds, 0.001 second to 3 second, 0.001 second to 2 seconds, 0.01 to 1 second, 0.01 to 0.5 second, 0.01 to 0.1 second, 0.01 to 0.05 second, or about 0.01 second. In various example embodiments, it may be desired to configure the consecutive time instances to have a period which is as small as possible so as to provide a smooth continuous haptic feedback to a subject. In other words, the information obtained on a scene (e.g., via a sensor) may be continuously fed to the image generator 104 (e.g., continuous in time series), and the information obtained on the scene at each time instance may then be processed by the image generator 104 to generate the corresponding depth map for that time instance, and the controller 106 may then control each haptic portion in the array of haptic portions 102 based on a property (e.g., pixel value) of the corresponding portion (e.g., a pixel or a group of adjacent pixels) of the depth map for that time instance.

Accordingly, the haptic system 100 according to various embodiments advantageously provides continuous haptic feedback to the subject, thus improving the driver's awareness of the surrounding environment in a continuous yet intuitive manner, thereby further improving the subject's ability to react to various events/situations effectively and the overall safety. In contrast, for example as mentioned in the background, conventional warning systems may only alert the driver of the existence of certain events. For example, such conventional warning systems may only provide a type of notification, which activate (or be in an "ON" state) to notify the driver when certain event(s) is detected and otherwise remain inactive (or be in an "OFF" state). However, since the warning or alert is based on a binary condition, the subject may thus not be able to anticipate such an alert and thus may be surprised when alerted, which may undesirably affect the subject's ability to react to various events/situations effectively and the overall safety.

In various embodiments, each of the array of haptic portions 102 is configured to be capable of performing the haptic action within a range of an attribute based on a control signal from the controller 106. In various embodiments, the haptic action comprises vibration, pulsation or applied pressure. In various embodiments, the attribute comprises frequency (intensity) and/or amplitude.

In various embodiments, each of the array of haptic portions (i.e., each haptic portion in the array of haptic portions) 102 corresponds to a respective one of the plurality of portions of the depth map. In various embodiments, each of the array of haptic portions spatially corresponds to a respective one of the plurality of portions of the depth map. That is, for example, neighboring or adjacent haptic portions correspond to neighboring or adjacent portions of the depth map, respectively. Furthermore, the controller 106 is configured to control each of the array of haptic portions 102 to perform the haptic action at a particular level of the attribute corresponding to the value of the property of the corresponding one of the plurality of portions of the depth map. For example, the controller 106 may send a respective control signal to each haptic portion to perform the haptic action at a particular level of the attribute determined based on the property of the portion of the depth map corresponding to the haptic portion. For example, if the property of the corresponding portion of the depth map detected has a value which is high, the control signal sent to the corresponding haptic portion may control the haptic portion to perform the haptic action at a correspondingly high level of the attribute (e.g., correspondingly high intensity).

In various embodiments, the range of the attribute for the haptic action corresponds to a range of values of the property related to the depth map, and each attribute level within the range of the attribute for the haptic action is predetermined to correspond to a value (or a sub-range of values) of the range of values of the property related to the depth map such that the haptic action performed at the particular level of the attribute by each of the array of haptic portions is indicative of the degree of proximity associated with the corresponding portion of the scene captured in the depth map. For example, each attribute level within the range of the attribute (e.g., the range of frequency and/or amplitude of the haptic action) may be predetermined to correspond to or correlate to a particular value (or a sub-range of values) of the range of values of the property related to the depth map (e.g., the range of pixel values), or vice versa. As a result, the haptic action performed at the particular level of the attribute by the respective haptic portion can be indicative of the degree of proximity associated with the corresponding portion of the scene captured in the depth map. For example, a very close degree of proximity associated with a portion of the scene capture in the depth map may result in the corresponding portion of the depth map being encoded to have a correspondingly large value, and the haptic action performed by the corresponding haptic portion may then be at a correspondingly high level of attribute (e.g., correspondingly high intensity).

In various embodiments, the range of the attribute for the haptic action is adjustable (or is adjusted or is configured) based on one or more characteristics associated with a portion of the subject. By way of an example only and without limitation, if the haptic action is to be performed on a back portion of the subject, the range of the attribute for the haptic action may be adjusted or configured based on a size (e.g., weight) of the back portion of the subject which the array of haptic portions will interact with. For example, a smaller range of attribute may be provided for a smaller sized person and a larger range of attribute may be provided for a larger sized person.

In various embodiments, the image generator 104 is configured to generate an initial depth map based on the information obtained on the scene, and adjust a resolution of the initial depth map based on a configuration of the haptic surface 102 to generate the depth map. In various embodiments, the resolution of the initial depth map is adjusted to generate the depth map to have a resolution that corresponds to a resolution of the haptic surface 102 formed such that each of the array of haptic portion corresponds to a respective one of the plurality of portions of the depth map, that is, a one-to-one correspondence. For example, if the array of haptic portions is configured to have a size (dimension) of M×N (which may also be referred to as having a resolution of M×N, that is, M×N haptic portions), the image generator 104 may be configured to adjust the resolution of the initial depth map (e.g., either increase or decrease its resolution) to match (or substantially match) that of the resolution of the haptic surface. As a result, the controller 106 may then be able to control each of the array of haptic portions 102 based on a property (e.g., pixel value) of a corresponding portion of the depth map, which has been adjusted to have a resolution matching that of the haptic surface (i.e., on a one-to-one correspondence basis).

In various embodiments, the resolution of the haptic surface is configured based on a spatial acuity of a part or portion of the subject which the haptic surface is configured to interact with.

In various embodiments, the array of haptic portions 102 is configured to topographically map a predetermined space (or desired space) in the surrounding environment so that each haptic portion spatially corresponds to a respective portion of the predetermined space, the predetermined space corresponding to the scene captured. For example, the haptic surface 102 is configured to correspond to a predetermined space in the surrounding environment, whereby the position of each haptic portion in the array of haptic portions spatially corresponds to a portion or region (having a coordinate, such as, a three-dimensional world coordinate or a Cartesian coordinate) in the predetermined space, such that neighboring or adjacent haptic portions correspond to neighboring or adjacent portions or regions in the predetermined space, respectively. Accordingly, the haptic surface comprising such an array of haptic portions 102 may also be referred to as a spatiotopic haptic surface.

In various embodiments, the information obtained on the scene is a point cloud data of the scene captured by a sensor (which may also be referred to as a scanner). By way of example only and without limitation, the sensor may be a Time-of-Flight (TOF) or laser-based sensor (e.g., a LIDAR (Light Detection and Ranging) sensor).

Figure 2:
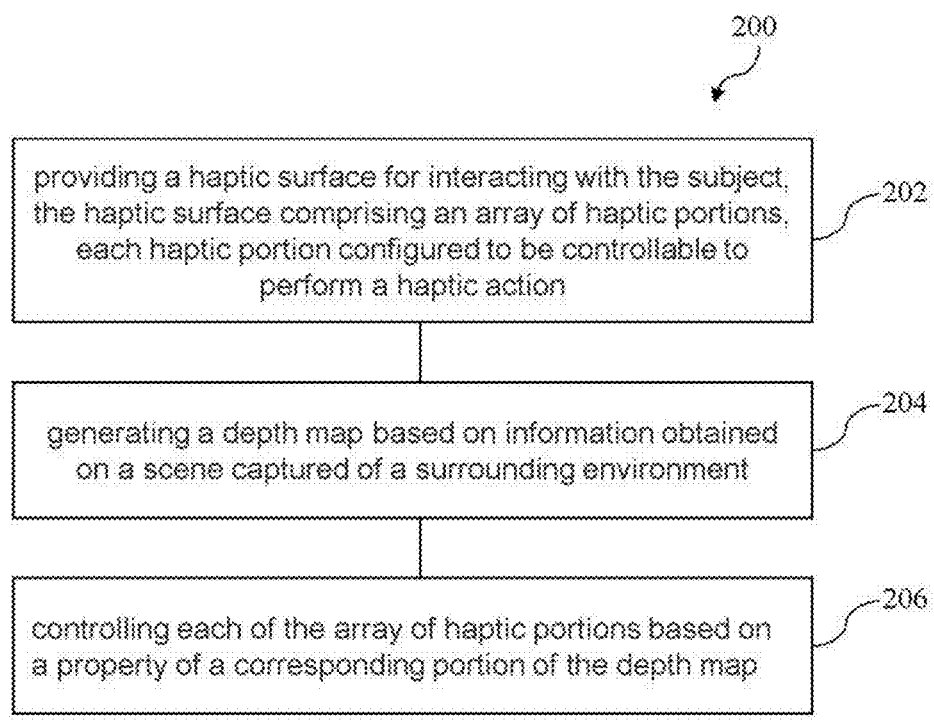
FIG. 2 depicts a schematic flow diagram of a method for providing sensory augmentation to a subject according to various embodiments of the present invention.

FIG. 2 depicts a schematic flow diagram of a method 200 for providing sensory augmentation to a subject according to various embodiments of the present invention. The method 200 comprises a step 202 of providing a haptic surface 102 for interacting with the subject, the haptic surface comprising an array of haptic portions, each haptic portion configured to be controllable to perform a haptic action; a step 204 of generating a depth map based on information obtained on a scene captured of a surrounding environment; and a step 206 of controlling each of the array of haptic portions based on a property of a corresponding portion of the depth map.

In various embodiments, the method 200 for providing sensory augmentation to a subject corresponds to the haptic system 100 as described hereinbefore with reference to FIG. 1. Therefore, various steps of the method 200 may correspond to, or the method 200 may include various steps corresponding to, one or more functions or operations configured to be performed by various modules or components of the haptic system 100 described in hereinbefore according to various embodiments of the present invention, and thus need not be repeated with respect to the method 200 for clarity and conciseness. In other words, various embodiments described herein in context of the haptic system 100 are analogously valid for the respective methods, and vice versa. For example and without limitation, the step 204 of generating a depth map may correspond to one or more functions or operations configured to be performed by the image generator 104, and the step 206 of controlling each of the array of haptic portions may correspond to one or more functions or operations configured to be performed by the controller 106.

In various embodiments, it will be appreciated by a person skilled in the art that various modules or components of the haptic system 100 described herein (e.g., the image generator (or image generator module) 104 and the controller (or controller module) 106) may be hardware module(s) (e.g., circuit(s)) being functional hardware unit(s) designed to perform the required functions/operations or software module(s) realized by computer program(s) or set(s) of instructions executable by at least one computer processor to perform the required functions/operations. It will also be appreciated that a combination of hardware and software modules may be implemented.

Figure 3:
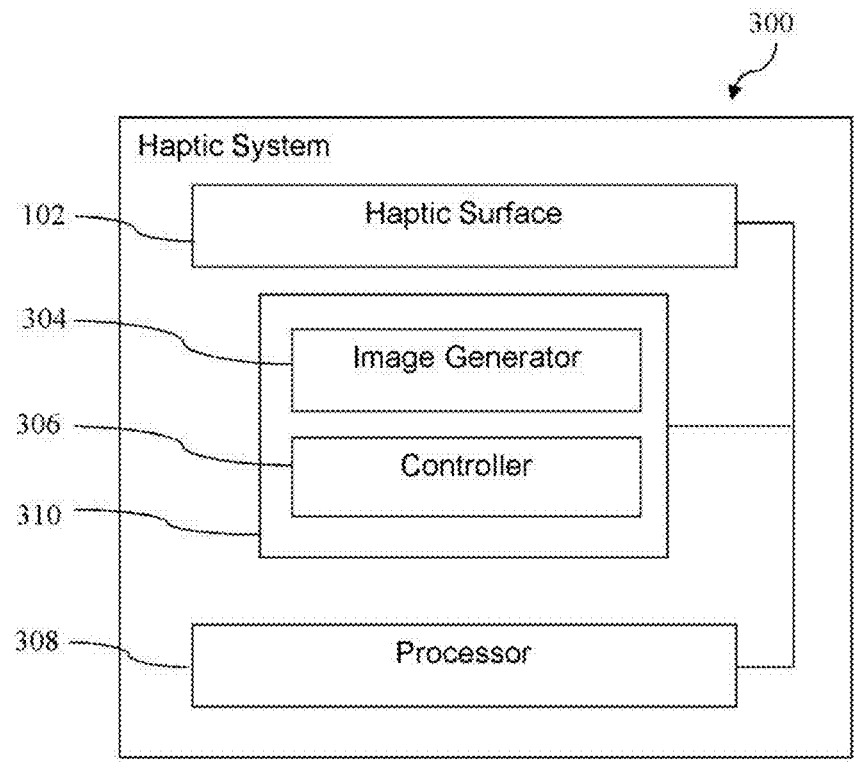
FIG. 3 depicts a schematic block diagram of a haptic system for providing sensory augmentation to a subject according to various embodiments of the present invention.

FIG. 3 depicts a schematic block diagram of a haptic system 300 for providing sensory augmentation to a subject according to various embodiments of the present invention for the case where the image generator and the controller are realized as software modules, and denoted in FIG. 3 with reference numbers 304 and 306, respectively. Accordingly, the haptic system 300 comprises at least one computer processor 308 and one or more computer-readable storage mediums (e.g., memory) 310. In particular, the image generator 304 and the controller 306 are software modules realized by computer program(s) or set(s) of instructions executable by at least one computer processor 308 to perform the required functions/operations. In various embodiments, the image generator 304 and the controller 306 may be stored in one or more computer-readable storage mediums (e.g., memory) 310 accessible by the computer processor 308 for the computer processor 308 to execute the software modules to perform the required or desired functions. For example, the computer-readable storage medium may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In various embodiments, a "circuit" may be understood as any kind of logic implementing entity, which may be a special purpose circuitry or a processor executing software stored in a memory, firmware, or any combination thereof. Thus, in an embodiment, a "circuit" may be a hard-wired logic circuit or a programmable logic circuit such as a programmable processor, e.g., a microprocessor (e.g., a Complex Instruction Set Computer (CISC) processor or a Reduced Instruction Set Computer (RISC) processor). A "circuit" may also be a processor executing software, e.g., any kind of computer program, e.g., a computer program using a virtual machine code, e.g., Java. Any other kind of implementation of the respective functions which will be described in more detail below may also be understood as a "circuit" in accordance with various alternative embodiments. Similarly, a "module" may be a portion of a system/device according to various embodiments in the present invention and may encompass a "circuit" as above, or may be understood to be any kind of a logic-implementing entity therefrom.

Some portions of the present disclosure are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise or the context clearly indicates otherwise, and as apparent from the following, it will be appreciated that throughout the present specification, discussions utilizing terms such as "generating", "controlling" or the like, refer to the actions and processes of a computer system, or similar electronic device, that manipulates and transforms data represented as physical quantities within the computer system into other data similarly represented as physical quantities within the computer system or other information storage, transmission or display devices.

In addition, the present specification also at least implicitly discloses a computer program or software/functional module, in that it would be apparent to the person skilled in the art that various individual steps of the methods described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

The software or functional modules described herein may also be implemented as hardware modules. More particularly, in the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the software or functional module(s) described herein can also be implemented as a combination of hardware and software modules.

It will be appreciated by a person skilled in the art that the terminologies used herein are for the purpose of describing various embodiments only and are not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In order that the present invention may be readily understood and put into practical effect, various example embodiments of the present invention will be described hereinafter by way of examples only and not limitations. It will be appreciated by a person skilled in the art that the present invention may, however, be embodied in various different forms or configurations and should not be construed as limited to the example embodiments set forth hereinafter. Rather, these example embodiments are provided so that this disclosure will be thorough and complete, and will fully convey the scope of the present invention to those skilled in the art.

For better understanding of the present invention and without limitation or loss of generality, the haptic system for providing sensory augmentation to a subject will now be described further with respect being implemented or installed in a vehicle according to various example embodiments of the present invention, such as a car, a van, a truck, a bus, or a motorcycle. However, it will be appreciated by a person skilled in the art that the haptic system is not limited to being implemented in a vehicle, and may be implemented in a wide variety of applications as desired or as appropriate, as long as a haptic effect based on the proximity to object(s) in a surrounding environment is desired to be produced to provide sensory augmentation to a subject, for example but not limited to, an article of clothing such as a vest (e.g., a vest having embedded therein the haptic system as described herein according to various embodiments of the present invention to provide or increase spatial awareness of the surrounding environment of a subject, for example, a visually impaired person, a motorcyclist, a person experiencing virtual reality (e.g., gaming), and so on).

Figure 4:
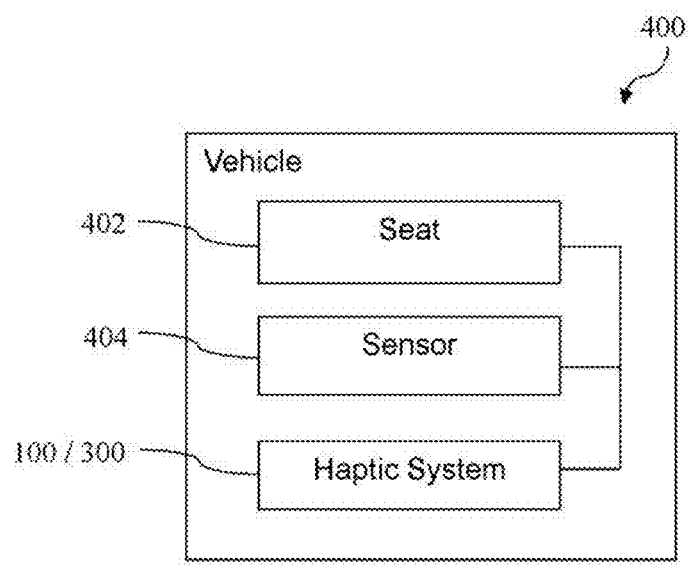
FIG. 4 depicts a schematic block diagram of a vehicle having installed therein a haptic system according to various example embodiments of the present invention

FIG. 4 depicts a schematic block diagram of a vehicle 400 according to various example embodiments of the present invention. The vehicle 400 comprises a seat 402; a sensor 404 configured to obtain information on the scene of the surrounding environment; and a haptic system 100/300 for providing sensory augmentation to a subject, such as the haptic system 100/300 as described herein according to various embodiments of the present invention. In particular, the haptic system 100/300 comprises a haptic surface 102 for interacting with the subject, the haptic surface comprising an array of haptic portions, each haptic portion configured to be controllable to perform a haptic action; an image generator 104/304 configured to generate a depth map based on the information obtained on a scene captured of a surrounding environment from the sensor 404; and a controller 106/306 configured to control each of the array of haptic portions 102 based on a property of a corresponding portion of the depth map. Furthermore, the haptic surface 102 is arranged on (e.g., a haptic device comprising the haptic surface 102 is embedded or integrated in) the seat 402 of the vehicle 400 to provide sensory augmentation to the subject when seated on the seat 402. By way of example only and without limitation, the sensor 402 may be a Time-of-Flight (TOF) or laser-based sensor (e.g., a LIDAR (Light Detection and Ranging) sensor) known in the art.

In various example embodiments, the seat 402 is the driver's seat and the subject is thus the driver of the vehicle.

In various embodiments, the scene includes the surrounding environment located rearward of the vehicle, for example, the scene behind the vehicle where the driver is not able to see while driving unless looking through a rearview mirror or physical turning his/her head around.

As mentioned hereinbefore, human sensory perception is limited by the nature of human senses. For example, humans are not able to see in the dark or at least not able to see sufficient well under low-visibility conditions, such as night, fog, rain, and so on. For example, TOF sensors are modalities that may detect objects, while not being affected by low-visibility conditions. According to various example embodiments of the present invention, a key concept is to create a sensory interface between the sensor and the subject (e.g., in relation to the human brain) via touch (i.e., haptic effect) for sensory augmentation to the subject (e.g., sensor-→touch→human brain). For example, the sensor image is directly propagated to the human brain through the sense of touch by using a spatiotopic haptic surface, such as the haptic surface 102 comprising the array of haptic portions as described hereinbefore according to various embodiments of the present invention. For example, the haptic system enables a person to directly sense the output of a sensor on the person's skin or body and perceive various information (e.g., position/direction of an object, proximity to an object, and/or size of an object) in a space of a surrounding environment through the sense of touch, without directly viewing that particular space.

Figure 5A:
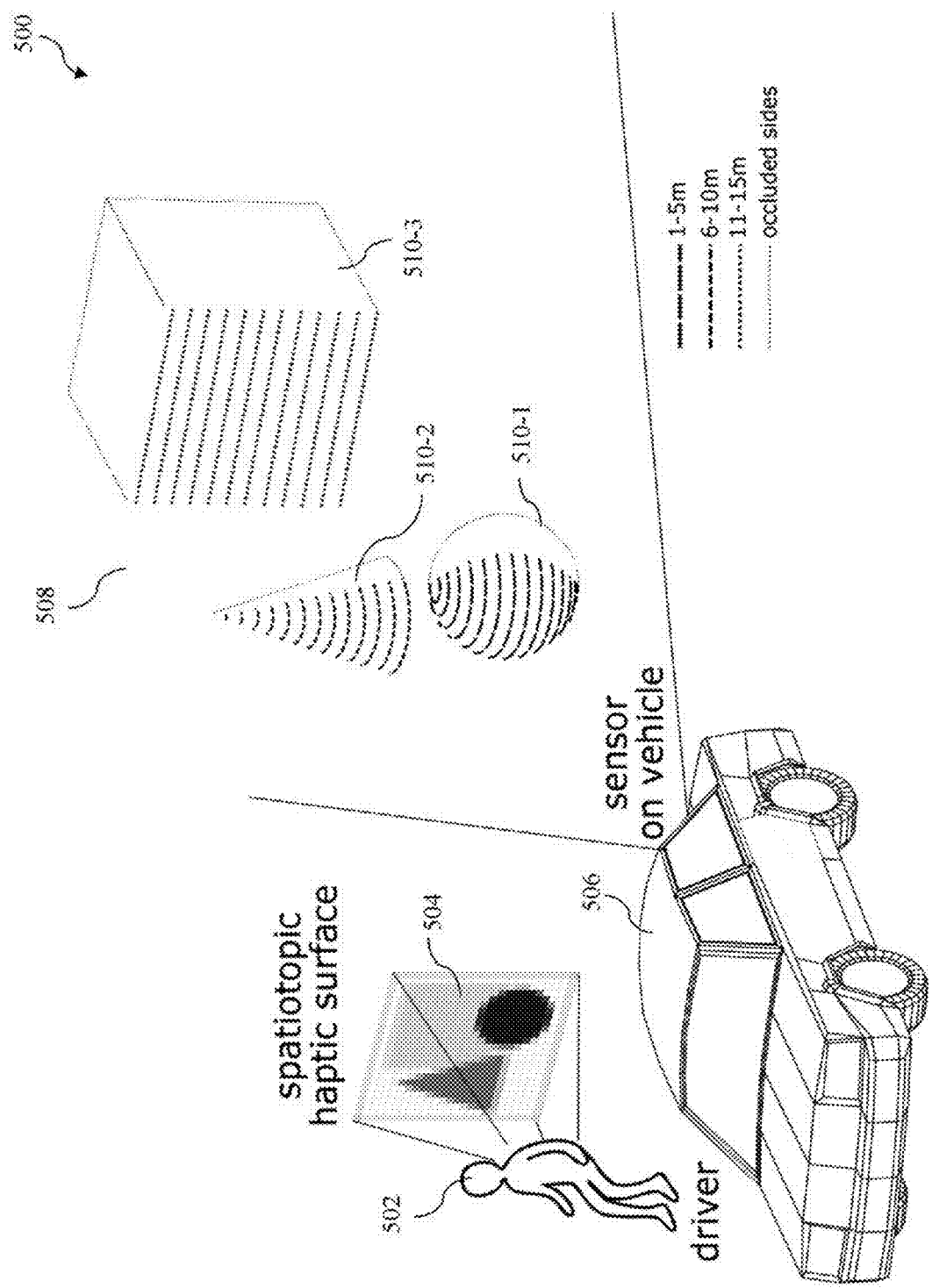
FIG. 5A depicts a schematic drawing showing an example environment in which a method for providing sensory augmentation to a subject is implemented according to various example embodiments of the present invention.

As an example illustration, FIG. 5A depicts a schematic drawing showing an example environment 500 in which a method for providing sensory augmentation to a subject 502 is implemented according to various example embodiments of the present invention. In the example, a sensory interface (in the form of a spatiotopic haptic surface) 504 between a TOF sensor (not shown in FIG. 5) and a driver 502 of a vehicle 506 via touch according to various example embodiments of the present invention for providing sensory augmentation to the driver 502 with respect to a scene 508 located rearward of the vehicle 506. For example, the haptic surface 504 (e.g., corresponding to the "haptic surface" described hereinbefore with reference to FIGS. 1 to 4 according to various embodiments) may be arranged on the backrest of the driver's seat and the driver 502 may feel different intensities of vibrations at different positions on his back corresponding to various information of one or more objects 510 detected by the sensor, such as the position/direction of the object(s), the proximity to the object(s), and/or the size of object(s). Accordingly, the haptic system according to various example embodiments advantageously eliminates, or at least reduces, blind spots by increasing spatial awareness of the surrounding environment located rearward of the vehicle 506 without direct visual observation, and even in low-visibility conditions. Accordingly, the vehicle 506 may serve as an extension of the driver's body since the driver 502 "feels" its surrounding environment through the spatiotopic haptic surface 504 embedded in the backrest of the driver's seat. The haptic system does not need to rely on vision or sound to extend the driver's senses. Thus, the driver's vision and hearing senses are not overloaded by additional information, and for example, can be used for processing information for other purposes, such as on the surrounding environment located frontward of the vehicle 506.

As illustrated in FIG. 5A, the haptic surface 504 is schematically shown as comprising a two-dimensional arrangement of haptic portions. It will be appreciated that the haptic surface 504 is not necessarily flat, but may have any shape as desired or as appropriate, such as to conform with a surface of a device or a component in which the haptic surface 504 is embedded (e.g., a curved shape to conform with the backrest of the driver's seat). In various example embodiments, the surface coordinates of the haptic portions spatially correspond to the world coordinates (or Cartesian coordinates) of a scene of interest, respectively. That is, for example, neighboring or adjacent haptic portions correspond to neighboring or adjacent portions of the scene, respectively, in accordance with the driver's perception of the world. As a result, information on the location/direction of one or more objects 510-1, 510-2, 510-3 detected in the scene (e.g., left rear side or right rear side of the vehicle 506) may be conveyed to the driver 502 through the haptic effect produced by the haptic portions at spatially corresponding positions in the haptic surface 504 (e.g. left rear side of the vehicle 506 corresponds to left part of the haptic surface 504, and right rear side of the vehicle 506 corresponds to right part of the haptic surface 504).

Figure 5B:
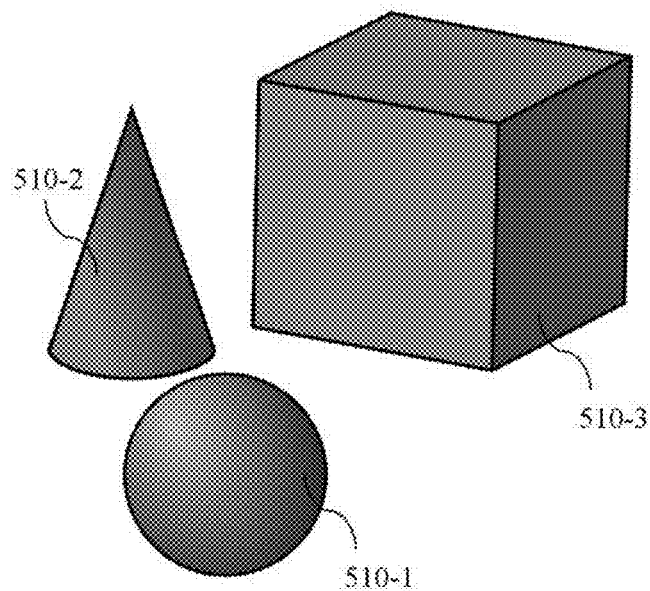
FIG. 5B depicts a schematic drawing of the objects in the scene shown in FIG. 5A.
Figure 5C:
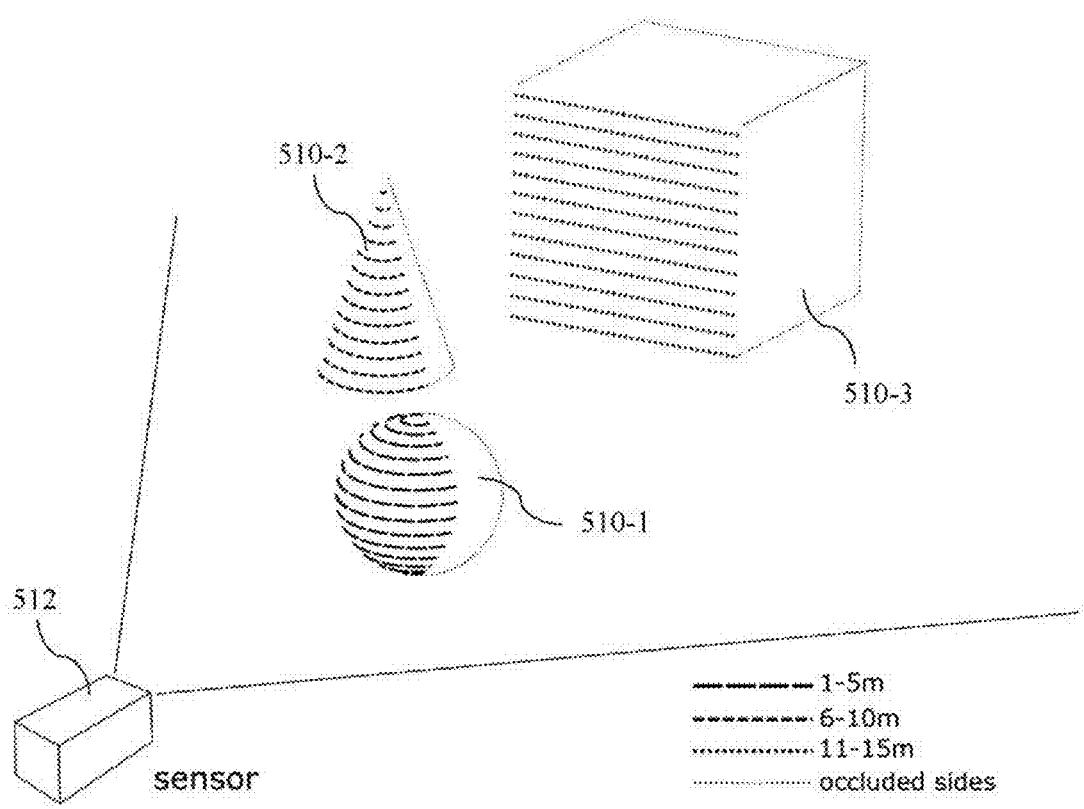
FIG. 5C depicts a schematic drawing illustrating a scanning result (point cloud data) from scanning the objects in the scene shown in FIG. 5A by a sensor.

For illustration purpose only, FIG. 5B depicts a schematic drawing of the objects 510-1, 510-2, 510-3 in the scene 508, and FIG. 5C depicts a schematic drawing illustrating a scanning result (point cloud data) from scanning the objects 510-1, 510-2, 510-3 in the scene 508 by a sensor (e.g., a TOF sensor, such as a LIDAR sensor) 512.

Figure 6:
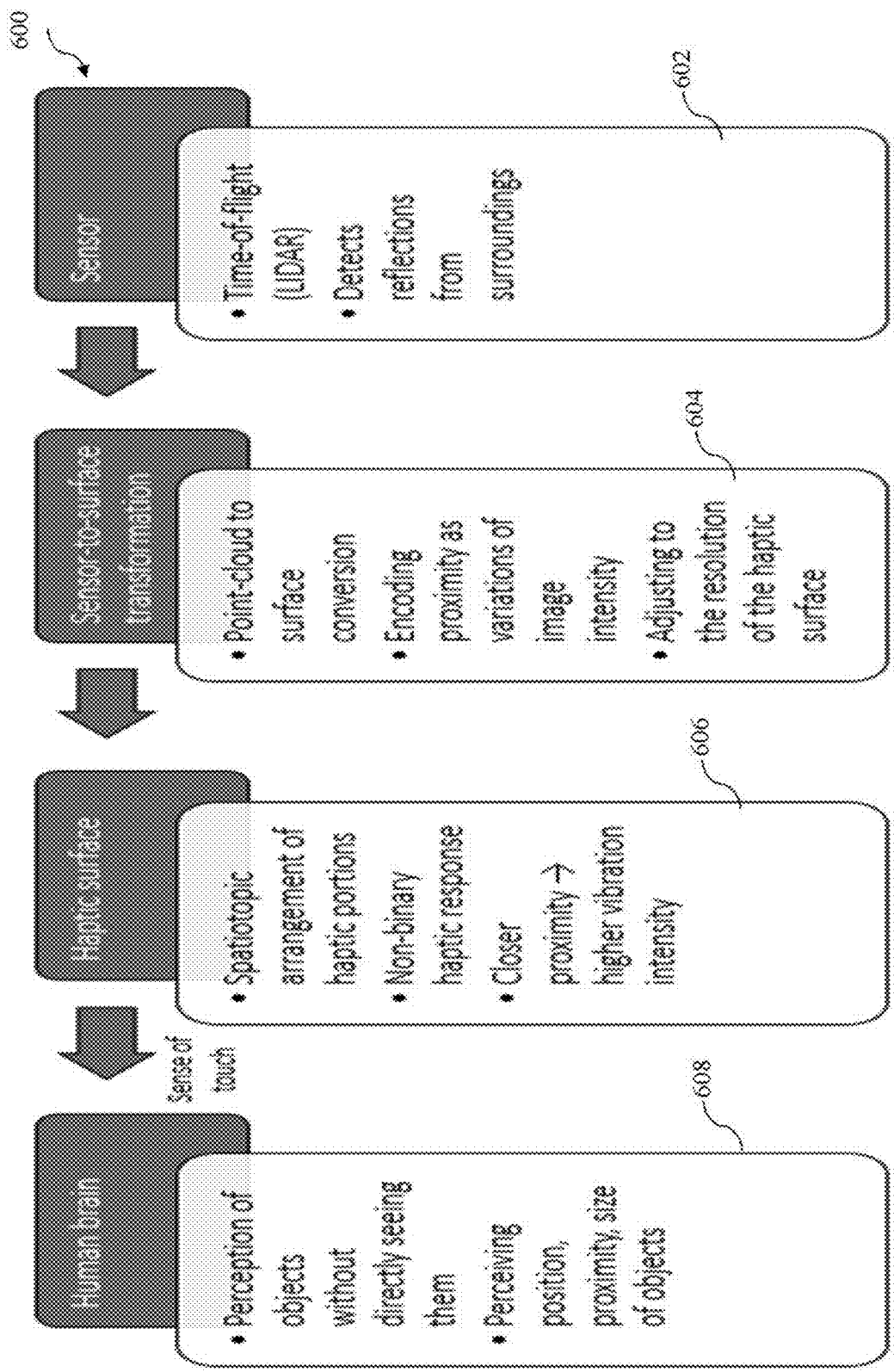
FIG. 6 depicts a schematic flow diagram of a method for providing sensory augmentation to a subject according to various example embodiments of the present invention.

FIG. 6 depicts a schematic flow diagram of a method 600 for providing sensory augmentation to a subject according to various example embodiments of the present invention. The method 600 comprises a first step or stage 602 of capturing, by a sensor, information on a scene of interest of a surrounding environment. In the example, the sensor may be a TOF sensor (e.g., LIDAR sensor) (e.g., corresponding to the sensor 404 as described hereinbefore) which detects surface reflections from the scene of interest in the surrounding environment.

The method 600 further comprises a second step or stage 604 of transforming the information obtained on the scene captured by the sensor to a depth map (a two-dimensional depth map or depth map surfaces). In the example, the information obtained is a three-dimensional point cloud data, which is then converted to a two-dimensional surface representation image (depth map), whereby each pixel of the depth map is encoded with a pixel value based on the degree of proximity associated with the corresponding portion of the scene captured (i.e., corresponding portion of the point cloud data). For example, differences in the degree of proximity associated with different portions of the point cloud data may be indicated by variations in the pixel values (e.g. image intensities) of corresponding pixels in the depth map. For example, the range of pixel values (e.g., minimum to maximum pixel values) associated with the depth map may correspond to the range of vibrational intensity (e.g., minimum to maximum vibrational intensity) associated with the array of haptic portions. The second stage 604 may further include adjusting the depth map to match (or substantially match) the resolution of the haptic surface. In various example embodiments, the second stage 604 may correspond to one or more functions or operations configured to be performed by the image generator 104/304 as described hereinbefore according to various embodiments of the present invention.

The method 600 further comprises a third step or stage 606 of controlling each of the array of haptic portions based on the pixel value of the corresponding pixel of the depth map. In this regard, the array of haptic portions has been spatiotopically arranged to form a spatiotopic haptic surface. For example, an object in the scene that has closer proximity to the vehicle may be encoded in the depth map having a larger pixel value (e.g., a larger intensity) at a portion thereof that corresponds to the location of the object than other object(s) or background in the scene that is farther from the vehicle, and the haptic portions that correspond to such a portion of the depth map may be controlled to vibrate with higher intensity than other haptic portions corresponding to portion(s) of the scene having object(s) or background that is farther away. In other words, closer proximity of an object detected in the scene may result in a correspondingly higher vibration intensity of the corresponding haptic portions, and on the other hand, farther object detected in the scene may result in a correspondingly lower vibration intensity of the corresponding haptic portions. In various example embodiments, the third stage 606 may correspond to one or more functions or operations configured to be performed by the controller 106 as described hereinbefore according to various embodiments of the present invention.

The fourth stage 608 shown in FIG. 6 corresponds to the haptic effect on the human brain as a result of the corresponding haptic action on the subject, that is, the effect on the human brain to perceive one or more objects in a scene of interest without directly seeing them but through the sense of touch, such as the position/direction of an object, the proximity to an object, and/or the size of an object.

Figure 7:
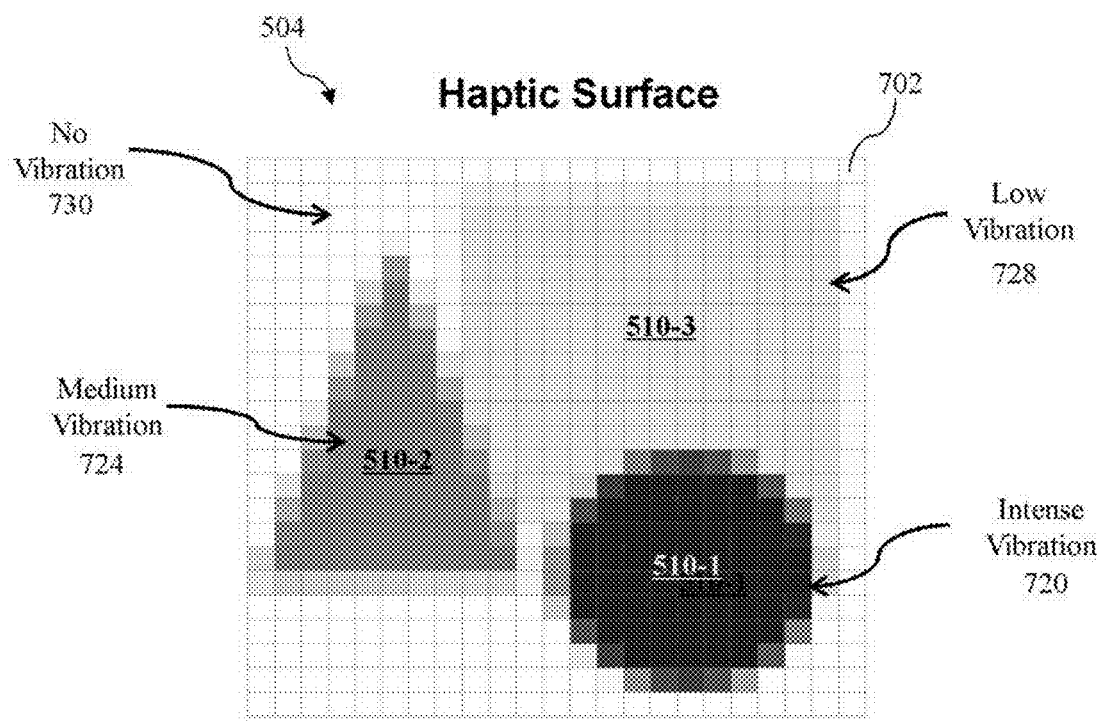
FIG. 7 depicts a schematic drawing of an example haptic surface including an array of haptic portions according to various example embodiments of the present invention, superimposed with images of objects detected in a scene of interest having different degree of proximity to a vehicle for illustration purpose only.

FIG. 7 depicts a schematic drawing of a haptic surface 504 comprising an array of haptic portions 702 (e.g., corresponding to the array of haptic portions 102 described hereinbefore according to various embodiments) according to various example embodiments of the present invention, superimposed with objects 510-1, 510-2, 510-3 detected in a scene 508 of interest with different degree of proximity to the vehicle 506 as shown in FIG. 5A, by way of an illustrative example only and without limitation. In the example, the array of haptic portions 702 is configured to have a size of 20×20 haptic portions as shown in FIG. 7. It will be appreciated by a person skilled in the art that FIG. 7 merely illustrates the arrangement of the haptic portions in the array, and the haptic portions may each be formed of any shape as desired or as appropriate. That is, the shape of each haptic portion is not limited to the shape shown in FIG. 7. Furthermore, for example, in the case of the haptic device comprising an array of haptic elements (i.e., the array of haptic portions being formed by the respective surfaces of an array of haptic elements), it will be appreciated by a person skilled in the art that adjacent or neighbouring haptic portions may be spaced apart (i.e., having a gap therebetween). Therefore, the haptic surface may not be a continuous surface. On the other hand, for example, in the case of a haptic device comprising a material having a surface comprising a plurality of portions being controllable to perform a haptic action, it will be appreciated by a person skilled in the art that the haptic surface may be a continuous surface, that is, the array of haptic portions are portions of the continuous surface of the material. In various example embodiments, each haptic portion may be independent from other haptic portions in the array, that is, each haptic portion may be individually or separately controllable based on a control signal to perform the corresponding haptic action (e.g., vibration) at a particular level. For example, each haptic portion is also controllable to perform variable degrees of vibration (e.g., variable frequency or intensity levels) based on the control signal received, the variable degree being proportional to the proximity of the corresponding object detected in the scene.

By way of an example only, FIG. 7 illustrates different haptic portions of the haptic surface 504 having different intensities of vibration based on different degrees of proximity of different objects 510-1, 510-2, 510-3 to the vehicle 506 in the scene 508 as shown in FIG. 5A. For example, a first set 720 of haptic portions may each be controlled to perform an intense level of vibration corresponding to the high degree of proximity of the corresponding object 510-1 to the vehicle 506, a second set 724 of haptic portions may each be controlled to perform a medium level of vibration corresponding to the medium degree of proximity of the corresponding object 510-2 to the vehicle 506, a third set 728 of haptic portions may each be controlled to perform a low level of vibration corresponding to the low degree of proximity of the corresponding object 510-3, and a fourth set 730 of haptic portions may each be controlled to perform no vibration due to the corresponding portion of the scene (e.g., background) being not proximate to the vehicle or no information was obtained.

Figure 8:
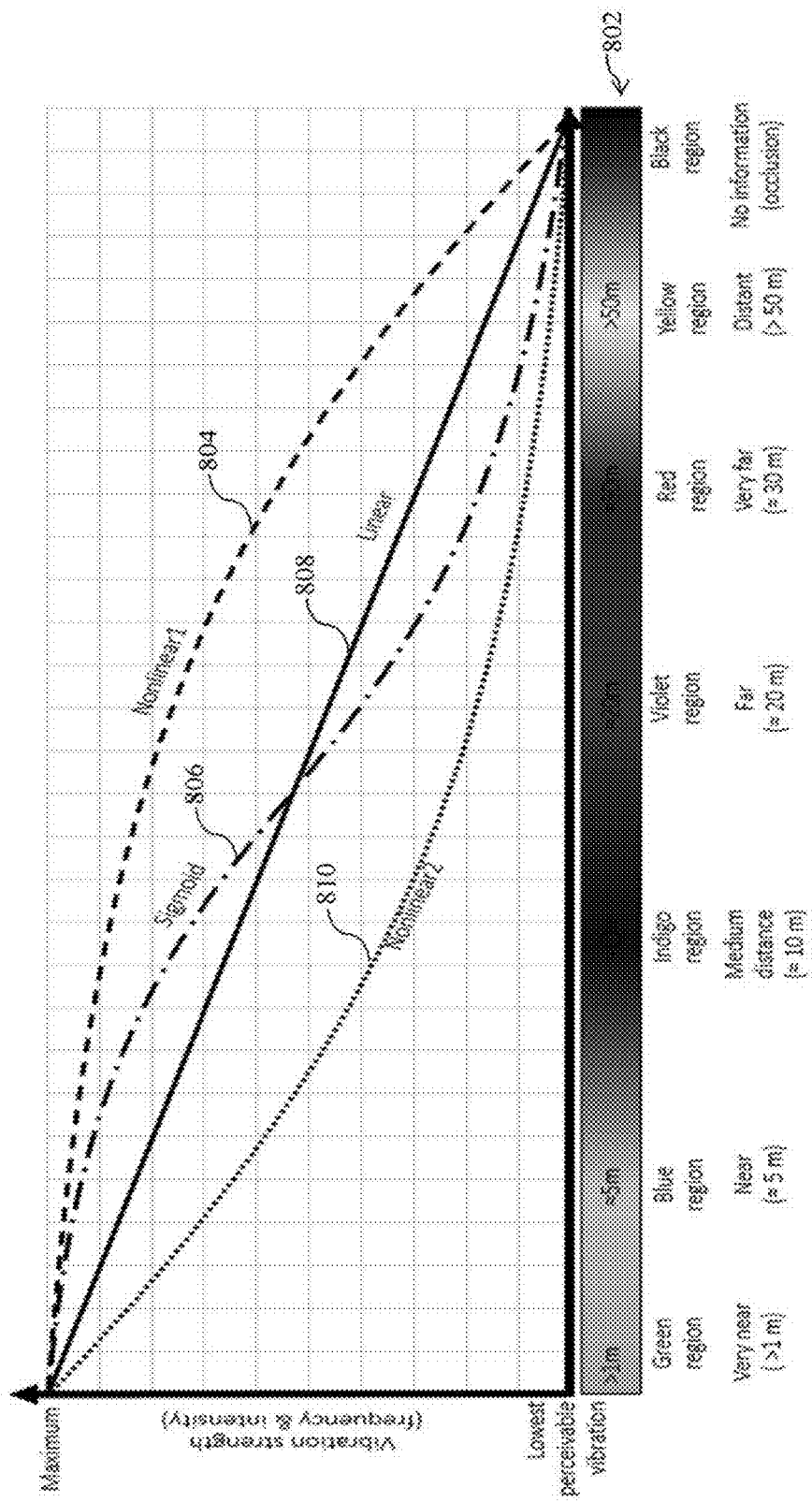
FIG. 8 depicts an example mapping profile between a range of degree of proximity detected and a range of pixel values for the depth map, and four exemplary mapping profiles between a range of pixel values for the depth map and a range of levels of vibration for the haptic portions.

It will be appreciated by a person skilled in the art that various mapping profiles as desired or as appropriate may be applied to map a range of degree of proximity detected to a corresponding range of values of property (e.g., range of pixel values) for the depth map, and from a range of values of property (e.g., pixel values) for the depth map to a corresponding range of attribute (e.g., range of levels of vibration) for the haptic portions. For illustration purpose and without limitation, FIG. 8 depicts an example mapping profile 802 between the range of degree of proximity detected and the range of pixel values for the depth map and four exemplary mapping profiles 804, 806, 808, 810 between the range of pixel values for the depth map and the range of levels of vibration for the haptic portions, namely, first non-linear profile 804, sigmoid profile 806, linear profile 808, and second non-linear profile 810. It will be appreciated by a person skilled in the art that the degrees of proximity (distances) shown in FIG. 8 are for illustration purpose only, and the distances may be adjusted/modified as desired or as appropriate based on various factors, such as according to the maximum reliable distance of the sensor used.

Figure 9:
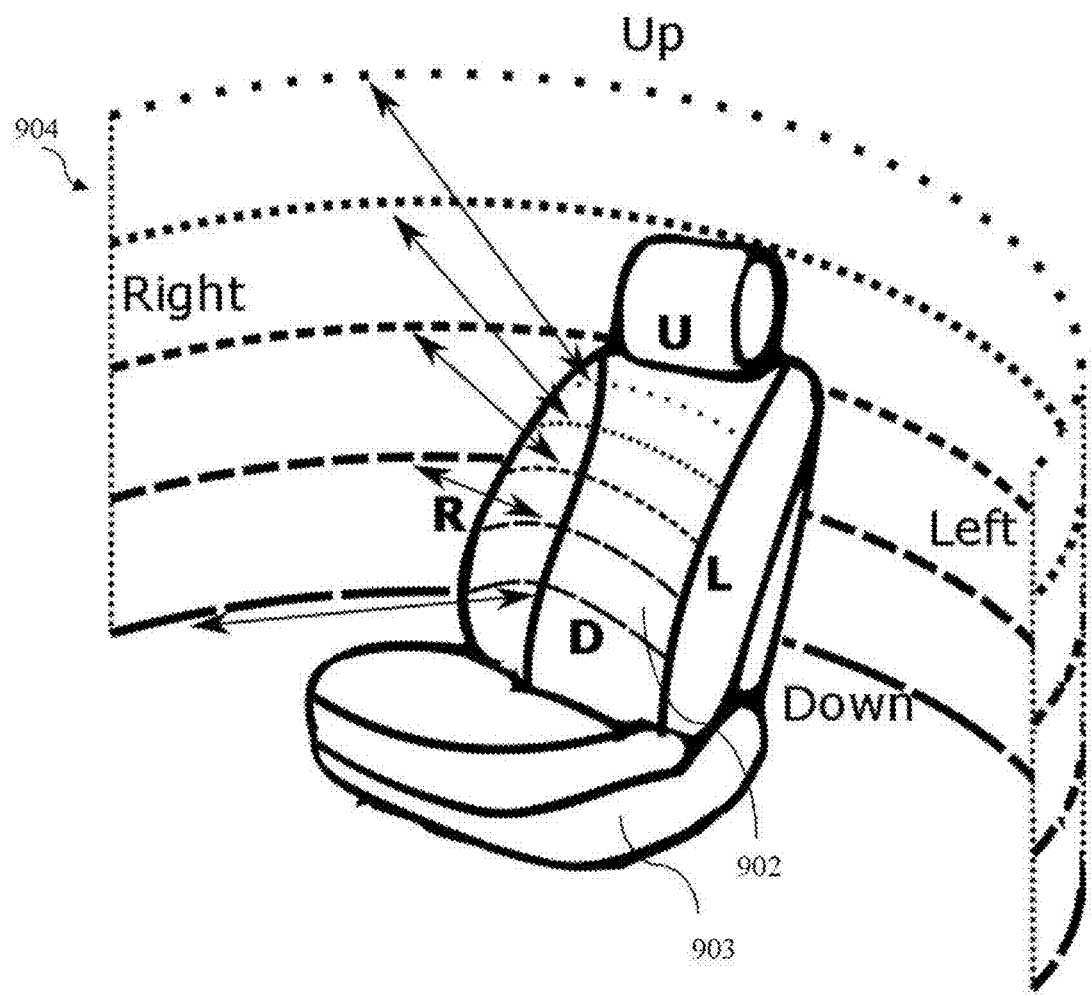
FIG. 9 depicts a schematic drawing showing where a haptic surface may be arranged on a seat to topographically map a predetermined space in the surrounding environment according to various example embodiments of the present invention.

FIG. 9 depicts a schematic drawing showing where a haptic surface 902 (e.g., corresponding to the haptic surface 102 described hereinbefore according to various embodiments) may be arranged on (e.g., a haptic device comprising the haptic surface 902 is embedded or integrated in) a seat 903 (in particular, a curved backrest of the seat 903), which is configured to topographically (or spatiotopically) map a predetermined space 904 in the surrounding environment according to various example embodiments of the present invention. In particular, each haptic portion of the array of haptic portions spatially corresponds to a respective portion of the predetermined space 904, whereby the predetermined space 904 corresponds to the scene captured. In other words, the haptic surface 902 comprising the array of haptic portions is organized in an orderly topographic mapping of the rear three-dimensional (3D) space 904 scanned by the sensor, thus forming a two-dimensional representation of the 3D space 904. Accordingly, the surface coordinates of the haptic portions spatially correspond to the world coordinates (or the Cartesian coordinates) of the 3D space 904, respectively, such as illustrated by the double-headed arrows in FIG. 9. That is, for example, neighboring or adjacent haptic portions correspond to neighboring or adjacent portions of the 3D space, respectively. Therefore, the haptic surface 902 may be referred to as a spatiotopic haptic surface.

In various example embodiments, the response of the haptic surface 902 may be adjusted to the size (e.g., weight) of the person's body (e.g., back) that will be touching it (e.g., smaller response for a smaller size person, and a larger response for a larger size person).

Figure 10:
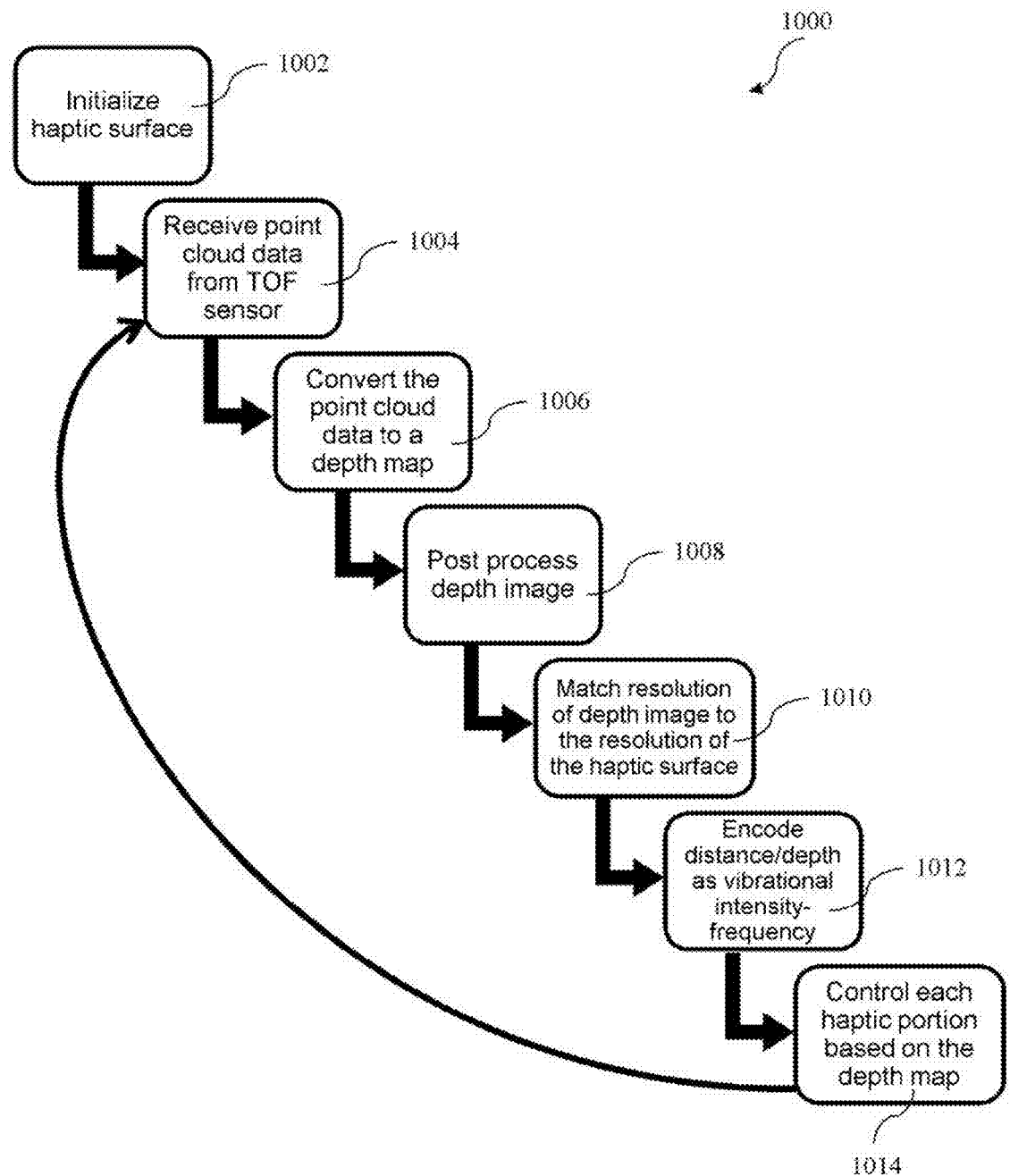
FIG. 10 depicts a schematic flow diagram of a method for providing sensory augmentation to a subject according to various example embodiments of the present invention.

FIG. 10 depicts a schematic flow diagram of a method 1000 for providing sensory augmentation to a subject according to various example embodiments of the present invention. The method 1000 comprises a first step or stage 1002 of initializing the haptic surface, for example, providing or configuring a haptic surface for interacting with the subject, the haptic surface comprising an array of haptic portions; a second step or stage 1004 of receiving 3D point cloud data from a TOF sensor for a time instance; a third step or stage 1006 of converting the 3D point cloud data received to a depth map, which is a two-dimensional representation or image of the 3D point cloud data; a fourth step or stage 1008 of post-processing the depth map to improve its quality, such as by filling occlusions, surface smoothing, and/or compensating for various types of artifacts; a fifth step or stage 1010 of matching the resolution of the depth map to the resolution of the haptic surface; a sixth step or stage 1012 of encoding each pixel of the depth map to have a pixel value corresponding to the degree of proximity (distance/depth) associated with the pixel; and a seventh step or stage 1014 of controlling each haptic portion in the array of haptic portions to perform a haptic action based on the pixel value of the corresponding pixel of the depth map.

The method 1000 then repeats steps 1002 to 1014 for each subsequent time instance continuously. Therefore, the depth map is continuously generated based on the respective information obtained on the scene continuously (in other words, for a plurality of consecutive time instances), and each haptic portion is continuously controlled such that for each time instance, each haptic portion is controlled based on the pixel value of the corresponding pixel of the depth map generated for that time instance. Accordingly, the haptic system according to various example embodiments advantageously provides continuous haptic feedback to the subject, thus improving the driver's awareness of the surrounding environment in a continuous yet intuitive manner, thereby further improving the subject's ability to react to various events/situations effectively and the overall safety.

In various example embodiments, the first stage 1002 of the method 1000 may include adjusting the effective resolution of the haptic surface (e.g., the number of haptic portions, for example, M×N haptic portions may be referred to as having a resolution of M×N) based on (e.g., to match) the spatial acuity of the body part (body portion) which the haptic surface is configured to interact with. For example, different body areas may have different tactile acuity resolutions. In various example embodiments, the first stage 1002 may include defining the lowest perceivable vibration intensity/frequency of the haptic surface, based on the tactile detection threshold ($T_d$) of the body portion which the haptic surface is configured to interact with. It will be appreciated by a person skilled in the art that the tactile detection threshold ($T_d$) of a particular body portion may be determined based on various conventional techniques known in the art, that is, techniques thereof would be understood by a person skilled in the art and thus need not be described in detail herein.

In various example embodiments, the second stage 1004 of the method 1000 may include capturing the 3D coordinates for each point in the space of interest in the surrounding environment to produce the point cloud data by a TOF sensor. Therefore, for each point in the space of interest, its distance to the TOF sensor is obtained.

In various example embodiments, regarding the third stage 1006, it will be appreciated by a person skilled in the art that converting the point cloud data to a depth map may be performed based on various conventional techniques known in the art, that is, techniques thereof would be understood by a person skilled in the art and thus need not be described in detail herein. Accordingly, the point cloud data is converted to a surface (two-dimensional) representation, namely, a depth map.

In various example embodiments, the fifth stage 1010 of the method 1000 may include scaling or resizing (e.g., upsampling or downsampling) the depth map initially generated (e.g., initial depth map) to produce a resized depth map (e.g., final depth map) to fit exactly (or substantially match) the resolution of the haptic surface. For example, the resizing process may be based on various conventional techniques known in the art, such as but not limited to, bilinear or bicubic resizing techniques.

In various example embodiments, regarding the sixth stage, the encoding of each pixel of the depth map may be performed based on any mapping profile (mapping function) between the range of degree of proximity detected and the range of pixel values for the depth map as desired or as appropriate, such as but not limited to, the mapping profile as shown in FIG. 8. Furthermore, each haptic portion in the array of haptic portions may also be controlled to perform a haptic action based on any type of vibration profile (vibration mapping function) between the range of pixel values for the depth map and the range of levels of vibration for the haptic portions as desired or as appropriate, such as but not limited to, any one of the different vibration profiles as shown in FIG. 8. As a result, for example, each haptic portion (e.g., vibrational element) will change its intensity/frequency based on the distance of the corresponding pixel in the depth map.

In various example embodiments, the third stage 1006 to sixth stages 1012 may correspond to one or more functions or operations configured to be performed by the image generator 104/304 as described hereinbefore according to various embodiments of the present invention.

In various example embodiments, the seventh stage 1014 may include correcting the orientation of the depth map in order to match the orientation of scene captured. For example, depending on the output of the sensor, a mirroring function may be applied to the depth image before controlling each haptic portion in the array of haptic portions based on the pixel value of the corresponding pixel of the depth map. It will be appreciated that the present invention is not limited to a mirroring function and various other types of functions known in the art for adjusting the orientation of an image may be applied. As a result, for example, haptic portions at the correct positions on the haptic surface corresponding to the location of an object in the scene may be actuated to provide the subject with the correct spatial awareness.

Figure 11A:
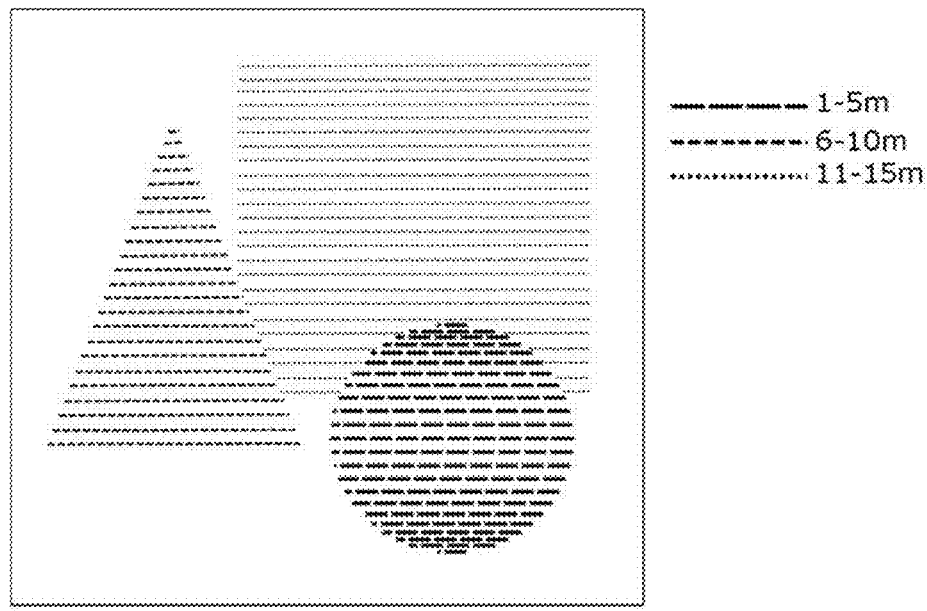
FIG. 11A depicts a schematic representation of point cloud data obtained from a sensor of a scene of interest according to an example embodiment of the present invention.
Figure 11B:
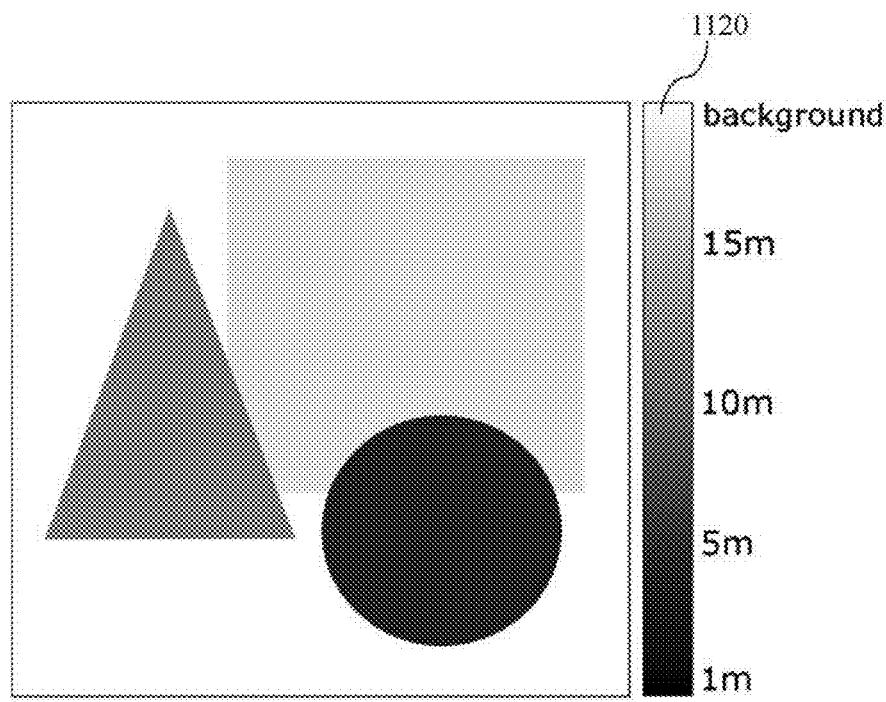
FIG. 11B depicts a schematic representation of a depth map (an initial depth map) generated based on the point cloud data of FIG. 11A, along with an example mapping profile.
Figure 11C:
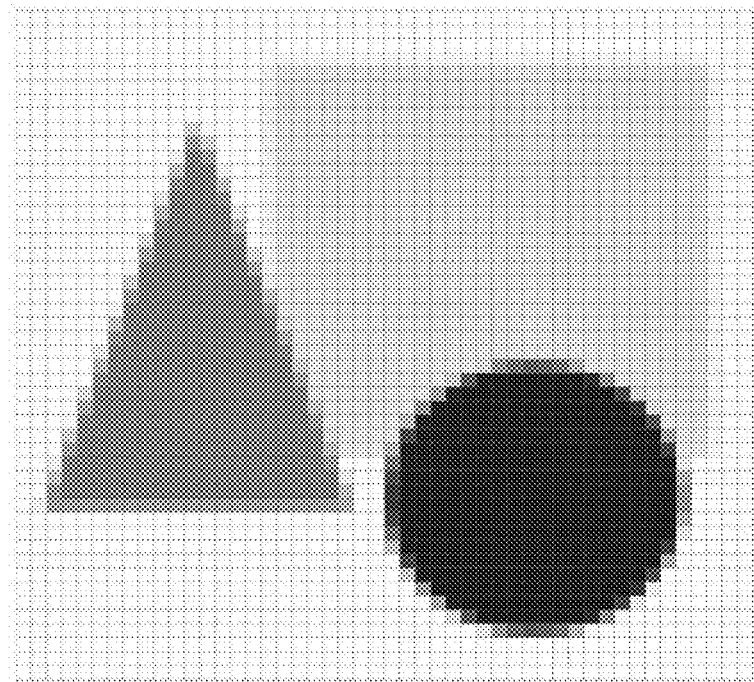
FIG. 11C depicts a schematic representation of the depth map of FIG. 11B which has been resized (downsampled) to have a resolution of 50×50 pixels.
Figure 11D:
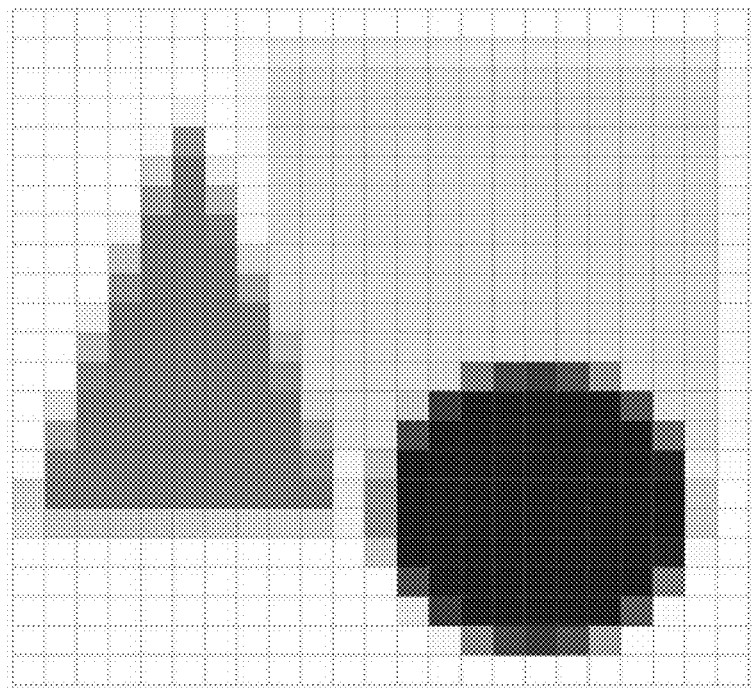
FIG. 11D depicts a schematic representation of the depth map of FIG. 11B which has been resized (downsampled) to have a resolution of 25×25 pixels.

For illustration purposes only and without limitation, FIGS. 11A to 11D depict drawings illustrating various stages of the method for providing sensory augmentation to a subject according to various example embodiments of the present invention In particular, FIG. 11A depicts a schematic representation of the point cloud data obtained from a TOF sensor scanning a scene of interest (e.g., the objects 510-1, 510-2, 510-3 in the scene 508 as shown in the example of FIG. 5A), FIG. 11B depicts a schematic representation of a depth map (initial depth map) generated based on the point cloud data of FIG. 11A, FIG. 11C depicts a schematic representation of the depth map resized (e.g., downsampled) to have a resolution of 50×50, such as to match a haptic surface having a resolution of 50×50 pixels, and FIG. 11D depicts a schematic representation of the depth map resized (e.g., downsampled) to have a resolution of 25×25 pixels, such as to match a haptic surface having a resolution of 25×25 pixels. FIG. 11B also depicts an example mapping profile (mapping function) 1120 applied in the example.

Figure 12:
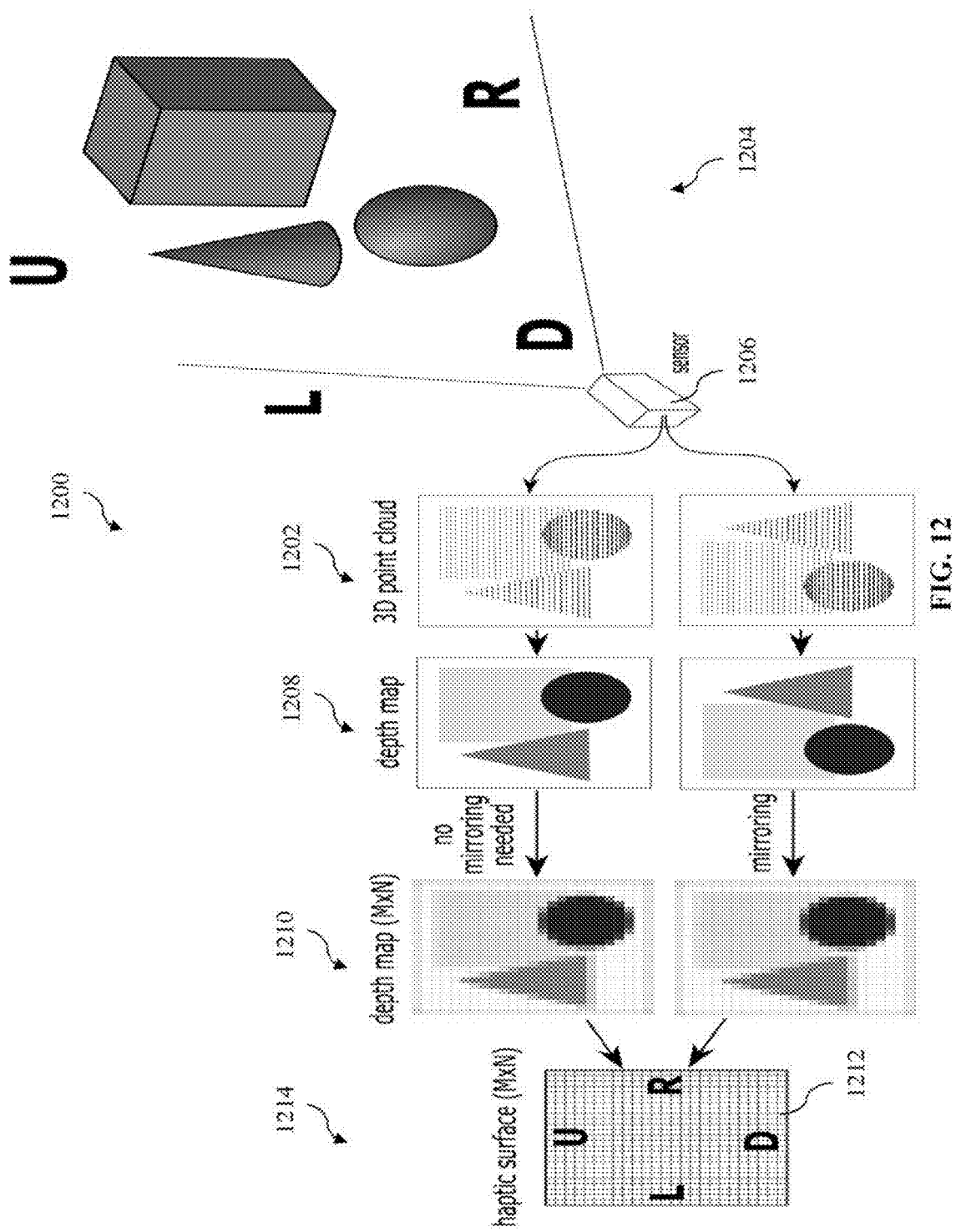
FIG. 12 depicts a schematic flow diagram illustrating a method for providing sensory augmentation to a subject according to various example embodiments.

FIG. 12 depicts a schematic flow diagram illustrating a method 1200 for providing sensory augmentation to a subject according to various example embodiments, including showing various stages of the method 1200. As shown in FIG. 12, the method 1200 comprises a step or stage 1202 of obtaining 3D point cloud data from a scene 1204 of interest by a sensor 1206 (e.g., corresponding to the "information obtained on a scene captured of a surrounding environment" as described hereinbefore according to various embodiments of the present invention); a step or stage 1208 of generating a depth map based on the 3D point cloud data obtained (e.g., corresponding to the "generating a depth map based on information obtained" as described hereinbefore according to various embodiments of the present invention); a step or stage 1210 of adjusting the resolution of the depth map generated to match the resolution of the haptic surface 1212 (e.g., corresponding to the "adjusting a resolution of the initial depth map" as described hereinbefore according to various embodiments of the present invention), and a step or stage 1214 of controlling each haptic portion of the haptic surface 1212 based on the pixel value of the corresponding pixel of the depth map (e.g., corresponding to the "control each of the array of haptic portions based on a property" as described hereinbefore according to various embodiments of the present invention). Furthermore, as illustrated in FIG. 12 with reference the corresponding labels "U" (denoting up), "D" (denoting down), "L" (denoting left), and "R" (denoting right) included for both the haptic surface 1212 and the scene 1204, the spatial correspondence between each haptic portion of the haptic surface 1212 and the corresponding portion of the scene 1204 can be seen. In FIG. 12, the upper row of representations illustrate the case where no mirroring of the depth map is required (e.g., since the orientations of the haptic surface and the depth map match), whereas, the lower row of representations illustrate the case where mirroring (or flipping) of the depth map is required (e.g., since the orientations of the haptic surface 1212 and the depth map are opposite to each other).

Thus, the haptic system according to various embodiments advantageously enables a subject (e.g., a driver) to sense object(s) without requiring to see or hear the object(s). This advantageously provides sensory augmentation to a subject, for example, providing a sixth sense (e.g., LiDAR sense), such as giving "bat vision" to drivers. In this regard, the haptic system according to various embodiments of the present invention advantageously provides an interface between sensors and the subject (e.g., in relation to the human brain), with the benefit that sensors are generally not affected by low visibility conditions. Therefore, for example, vision and hearing are not overloaded with information from the rear, instead, such information reaches the brain through the sense of touch.

It will be appreciated that the haptic system and the method thereof according to various embodiments of the present invention are not limited to being implemented in a vehicle, and may be implemented in a wide variety of applications as desired or as appropriate, as long as a haptic effect based on the proximity to object(s) in a surrounding environment is desired to be produced to provide sensory augmentation to a subject, such as but not limited to an article of clothing such as a vest (e.g., a vest having embedded therein the haptic system as described herein according to various embodiments of the present invention to provide or increase the spatial awareness of the surrounding environment of a subject, for example, a visually impaired person, a motorcyclist, a person in a virtual reality environment (e.g., gaming), and so on). For example, in the automotive industry, the haptic system according to various embodiments of the present invention may enable safer driving under all conditions, or improved driving experience such as enabling a faster response from events at scene located rearward of the vehicle (e.g., assisting to avoid collision with an object or enabling the driver to be aware that a vehicle is approaching during racing or a combat).

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A haptic system for providing sensory augmentation to a driver of a potential collision, the haptic system comprising:
   a haptic surface for interacting with the driver, the haptic surface comprising an array of haptic portions, each haptic portion configured to be controllable to perform a haptic action;
   an image generator configured to generate a depth map based on information obtained on a scene captured of a surrounding environment by a sensor; and
   a controller configured to control each of the array of haptic portions based on a property of a corresponding portion of the depth map.

2. The haptic system according to claim 1, wherein the depth map comprises a plurality of portions, the property of each portion being determined based on a degree of proximity associated with a corresponding portion of the scene captured in the depth map.

3. The haptic system according to claim 2, wherein the degree of proximity associated with a corresponding portion of the scene relates to a distance of a surface of one or more scene objects captured in the corresponding portion of the scene from a viewpoint.

4. The haptic system according to claim 2, wherein each portion of the depth map corresponds to a pixel or a group of adjacent pixels, and the property of each portion has a value corresponding to a pixel value.

5. The haptic system according to claim 1, wherein the image generator is configured to generate the depth map continuously for a plurality of consecutive time instances based on the respective information obtained on the scene continuously for the plurality of consecutive time instances, and the controller is configured to control each of the array of haptic portions continuously such that for each time instance, each of the array of haptic portions is controlled based on the property of the corresponding portion of the depth map generated for the time instance.

6. The haptic system according to claim 2, wherein each of the array of haptic portions is configured to be capable of performing the haptic action within a range of an attribute based on a control signal from the controller.

7. The haptic system according to claim 6, wherein the haptic action comprises vibration, pulsation or applied pressure.

8. The haptic system according to claim 6, wherein the attribute comprises frequency and/or amplitude.

9. The haptic system according to claim 6, wherein each of the array of haptic portions corresponds to a respective one of the plurality of portions of the depth map, and the controller is configured to control each of the array of haptic portions to perform the haptic action at a particular level of the attribute corresponding to the value of the property of the corresponding one of the plurality of portions of the depth map.

10. The haptic system according to claim 9, wherein the range of the attribute for the haptic action corresponds to a range of values of the property related to the depth map, and each attribute level within the range of the attribute for the haptic action is predetermined to correspond to a value or a sub-range of values of the range of values of the property related to the depth map such that the haptic action performed at the particular level of the attribute by each of the array of haptic portions is indicative of the degree of proximity associated with the corresponding portion of the scene captured in the depth map.

11. The haptic system according to claim 9, wherein the range of the attribute for the haptic action is adjustable based on a characteristic associated with a portion of the driver.

12. The haptic system according to claim 1, wherein the image generator is configured to generate an initial depth map based on the information obtained on the scene, and adjust a resolution of the initial depth map based on a configuration of the haptic surface to generate the depth map.

13. The haptic system according to claim 12, wherein the resolution of the initial depth map is adjusted to generate the depth map to have a resolution that corresponds to a resolution of the haptic surface formed such that each of the array of haptic portions corresponds to a respective one of the plurality of portions of the depth map.

14. The haptic system according to claim 13, wherein the resolution of the haptic surface is configured based on a spatial acuity of a portion of the driver which the haptic surface is configured to interact with.

15. The haptic system according to claim 1, wherein the haptic surface is configured to topographically map a predetermined space in the surrounding environment so that each haptic portion spatially corresponds to a respective portion of the predetermined space, the predetermined space corresponding to the scene captured.

16. The haptic system according to claim 1, wherein the information obtained on the scene is a point cloud data of the scene captured by the sensor.

17. A vehicle comprising:
   a seat;
   a sensor configured to obtain information on a scene of a surrounding environment; and
   a haptic system for providing sensory augmentation to a driver of a potential collision, the haptic system comprising:
      a haptic surface for interacting with the driver, the haptic surface comprising an array of haptic portions, each haptic portion configured to be controllable to perform a haptic action;
      an image generator configured to generate a depth map based on the information obtained on the scene captured of the surrounding environment by the sensor; and
      a controller configured to control each of the array of haptic portions based on a property of a corresponding portion of the depth map, wherein the haptic surface is arranged on the seat of the vehicle to provide sensory augmentation to the driver when seated on the seat.

18. The vehicle according to claim 17, wherein the scene includes the surrounding environment located rearward of the vehicle.

19. A method for providing sensory augmentation to a driver of a potential collision, the method comprising:
providing a haptic surface for interacting with the driver, the haptic surface comprising an array of haptic portions, each haptic portion configured to be controllable to perform a haptic action;
generating a depth map based on information obtained on a scene captured of a surrounding environment by a sensor; and
controlling each of the array of haptic portions based on a property of a corresponding portion of the depth map.

20. The method according to claim 19, wherein the depth map comprises a plurality of portions, the property of each portion being determined based on a degree of proximity associated with a corresponding portion of the scene captured in the depth map.

21. The method according to claim 20, wherein the degree of proximity associated with a corresponding portion of the scene relates to a distance of a surface of one or more scene objects captured in the corresponding portion of the scene from a viewpoint.

22. The method according to claim 20, wherein each portion of the depth map corresponds to a pixel or a group of adjacent pixels, and the property of each portion has a value corresponding to a pixel value.

23. The method according to claim 19, wherein the generating a depth map comprises generating the depth map continuously for a plurality of consecutive time instances based on the respective information obtained on the scene continuously for the plurality of consecutive time instances, and the controlling each of the array of haptic portions comprises controlling each of the array of haptic portions continuously such that for each time instance, each of the array of haptic portions is controlled based on the property of the corresponding portion of the depth map generated for the time instance.

24. The method according to claim 20, wherein each of the array of haptic portions is configured to be capable of performing the haptic action within a range of an attribute based on a control signal.

25. The method according to claim 24, wherein the haptic action comprises vibration, pulsation or applied pressure.

26. The method according to claim 24, wherein the attribute comprises frequency and/or amplitude.

27. The method according to claim 24, wherein each of the array of haptic portions corresponds to a respective one of the plurality of portions of the depth map, and the controller is configured to control each of the array of haptic portions to perform the haptic action at a particular level of the attribute corresponding to the value of the property of the corresponding one of the plurality of portions of the depth map.

28. The method according to claim 27, wherein the range of the attribute for the haptic action corresponds to a range of values of the property related to the depth map, and each attribute level within the range of the attribute for the haptic action is predetermined to correspond to a value or a sub-range of values of the range of values of the property related to the depth map such that the haptic action performed at the particular level of the attribute by each of the array of haptic portions is indicative of the degree of proximity associated with the corresponding portion of the scene captured in the depth map.

29. The method according to claim 27, further comprising adjusting the range of the attribute for the haptic action based on a characteristic associated with a portion of the driver.

30. The method according to claim 20, wherein the generating a depth map comprises generating an initial depth map based on the information obtained on the scene, and adjusting a resolution of the initial depth map based on a configuration of the haptic surface to generate the depth map.

31. The method according to claim 30, wherein the resolution of the initial depth map is adjusted to generate the depth map to have a resolution that corresponds to a resolution of the haptic surface formed such that each of the array of haptic portions corresponds to a respective one of the plurality of portions of the depth map.

32. The method according to claim 31, wherein the resolution of the haptic surface is configured based on a spatial acuity of a portion of the subject which the haptic surface is configured to interact with.

33. The method according to claim 19, wherein the haptic surface is configured to topographically map a predetermined space in the surrounding environment so that each haptic portion spatially corresponds to a respective portion of the predetermined space, the predetermined space corresponding to the scene captured.

34. The method according to claim 19, wherein the information obtained on the scene is a point cloud data of the scene captured by the sensor.

* * * * *